United States Patent
Katano et al.

(10) Patent No.: US 8,088,531 B2
(45) Date of Patent: Jan. 3, 2012

(54) FUEL CELL SYSTEM

(75) Inventors: Koji Katano, Toyota (JP); Norio Yamagishi, Aichi-ken (JP); Nobutaka Teshima, Kariya (JP); Akihisa Hotta, Ichinomiya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 776 days.

(21) Appl. No.: 12/279,638

(22) PCT Filed: Jul. 6, 2007

(86) PCT No.: PCT/JP2007/063942
§ 371 (c)(1),
(2), (4) Date: Aug. 15, 2008

(87) PCT Pub. No.: WO2008/015896
PCT Pub. Date: Feb. 7, 2008

(65) Prior Publication Data
US 2010/0233563 A1 Sep. 16, 2010

(30) Foreign Application Priority Data
Aug. 1, 2006 (JP) .................................. 2006-209784

(51) Int. Cl.
*H01M 8/04* (2006.01)
(52) U.S. Cl. ........................................................ 429/446
(58) Field of Classification Search .................. 429/446, 429/444; H01M 8/04
See application file for complete search history.

(56) References Cited

U.S. PATENT DOCUMENTS

| | | | |
|---|---|---|---|
| 2005/0038560 A1 | 2/2005 | Nagasaka | |
| 2005/0107916 A1 | 5/2005 | Nagasaka | |
| 2005/0130000 A1* | 6/2005 | Ojima et al. | 429/22 |
| 2007/0248858 A1* | 10/2007 | Blaszczyk et al. | 429/25 |

FOREIGN PATENT DOCUMENTS

| | | |
|---|---|---|
| JP | 2002-246045 A | 8/2002 |
| JP | 2003-100334 A | 4/2003 |
| JP | 2005-332648 A | 12/2005 |
| JP | 2005-339847 A | 12/2005 |
| JP | 2006-049103 A | 2/2006 |
| JP | 2006-99963 A | 4/2006 |
| JP | 2006-134861 A | 5/2006 |
| JP | 2006-147346 A | 6/2006 |
| JP | 2006-185705 A | 7/2006 |

* cited by examiner

*Primary Examiner* — Javaid Nasri
(74) *Attorney, Agent, or Firm* — Kenyon & Kenyon LLP

(57) ABSTRACT

The present application provides a technique prevents a regulator arranged on a gas supplying path that supplies gas to a fuel cell installed in a fuel cell system from functioning erroneously, by controlling the pressure increase within the upper stream side of the regulator. The fuel cell system includes a fuel cell, an oxide gas supplying path to supply oxide gas to the fuel cell, a fuel gas supplying path to supply fuel gas to the fuel cell, a secondary regulator arranged on the fuel supplying path, a bypass path communicating the upper stream side path of the secondary regulator with the lower stream side path of the secondary regulator, and a pressure controlling valve that is closed in a case where the pressure difference between the upper stream side path and the lower stream side path is less than a predetermined amount, and opened in a case where the pressure difference between the upper stream side path and the lower stream side path exceeds the predetermined amount.

19 Claims, 1 Drawing Sheet

FUEL CELL SYSTEM

This is a 371 national phase application of PCT/JP2007/063942 filed 6 Jul. 2007, which claims priority of Japanese Patent Application No. 2006-209784 filed 1 Aug. 2006, the contents of which are incorporated herein by reference.

This application claims priority to Japanese Patent Application No. 2006-209784 filed on Aug. 1, 2006, the contents of which are hereby incorporated by reference into the present application.

TECHNICAL FIELD

The present invention relates to a fuel cell system that includes a fuel cell, a fuel gas supplying path that supplies fuel gas to the fuel cell and an oxide gas supplying path that supplies oxide gas to the fuel cell. In particular, the present invention relates to a fuel cell system capable of preventing excessive pressure being applied to a regulator arranged on a gas supplying path.

BACKGROUND ART

A fuel cell system having a fuel cell and gas supplying paths for supplying fluids such as a fuel gas or an oxide gas that are used by the fuel cell to cause electrochemical reaction is being developed.

For example, in a case of a fuel cell system using PEFC (Polymer Electrolyte Fuel Cell), difference in pressure between the air electrode and the fuel electrode may become large. Under such circumstances, undesirable conditions such as a degrading of electrolyte membrane of the fuel cell, or a decline in the durability of the fuel cell may happen. To prevent such undesirable conditions from happening, a technique to control the amount of hydrogen gas that is supplied to the fuel electrode side and the amount of oxide gas that is supplied to the air electrode side is being developed. By using such technique, the pressures of the air electrode side and the fuel electrode side of the fuel cell are maintained in a stable manner.

Japanese Patent Application Publication No. 2002-246045 discloses a fuel cell system that includes a primary regulator arranged at a gas exit of a hydrogen gas tank. A secondary regulator is arranged on a hydrogen gas supplying path that leads the hydrogen gas released through the primary regulator to the fuel cell. The secondary regulator is controlled in accordance with the operation status of the fuel cell. Furthermore, in the aforementioned fuel cell system, a bypass path is connected to the hydrogen gas supplying path. The bypass path communicates the upper stream side of the secondary regulator with the lower stream side of the secondary regulator. A shutoff valve is arranged on the bypass path. A controller controls the secondary regulator and the shutoff valve.

In the fuel cell system, the hydrogen gas inside the hydrogen gas tank is controlled to be at a predetermined pressure level by the primary regulator. The pressure of the hydrogen gas whose pressure has been controlled by the primary regulator is then further moderated by the secondary regulator. The secondary regulator is controlled in accordance with the operation status of the fuel cell. The secondary regulator adjusts the pressure amount of the hydrogen gas to be supplied to the fuel cell. With the aforementioned configuration, the pressure difference between the air electrode side and the fuel electrode side within the fuel cell is stably maintained. Undesirable conditions such as the degrading of electrolyte membrane of the fuel cell or the decline in the durability of the fuel cell are thus prevented.

DISCLOSURE OF INVENTION

In the aforementioned conventional fuel cell system, a large pressure may be applied to the secondary regulator arranged on the hydrogen gas supplying path. The secondary regulator may function erroneously due to the excessive pressure. For example, in a case where the gas exit of the hydrogen tank is air tightly closed, while small amount of hydrogen gas is leaking from the secondary regulator, the pressure of the hydrogen gas in the hydrogen gas supplying path extending on the upper stream side of the secondary regulator is decreased to an air pressure level. If the fuel cell is activated during such condition, the highly compressed gas within the hydrogen gas tank is released into the hydrogen gas supplying path, and then the gas pressure of the upper stream side of the secondary regulator rapidly elevates with the compressed gas spouting out therein. A temporal pressure peak may occur in the hydrogen gas supplying path within the upper stream side. Excessive pressure is thus applied to the secondary regulator, and such pressure may cause the secondary regulator to erroneously open its valve. Furthermore, in a case where the components arranged on the upper stream side of the secondary regulator (for example, the primary regulator) having failed, the highly compressed gas spouting out from the hydrogen gas tank may cause a pressure peak in the hydrogen gas supplying path within the upper stream side. This may also result in the secondary regulator to function erroneously.

In the aforementioned fuel cell system, the bypass path communicates the upper stream side of the secondary regulator with the lower stream side of the secondary regulator. Furthermore, the shutoff valve is arranged on the bypass path. However, the shutoff valve is to be opened in a case where a purge is being executed, and the shutoff valve is not opened in a case where the gas pressure in the upper stream side of the secondary regulator excessively increases. Thus, such excessive increase of gas pressure within the upper stream side of the secondary regulator cannot be controlled, and erroneous operation of the secondary regulator cannot be prevented.

The present invention provides a technique to prevent a regulator arranged on a gas supplying path that supplies gas to a fuel cell installed in a fuel cell system from functioning erroneously, by controlling the pressure increase within the upper stream side of the regulator.

The fuel cell system of the present invention comprises a fuel cell, a fuel gas supplying path connected to the fuel cell, an oxide gas supplying path connected to the fuel cell, a regulator arranged on at least one of the fuel gas supplying path and the oxide gas supplying path, a bypass path that communicates an upper stream side path of the regulator with a lower stream side path of the regulator, and a pressure controlling valve arranged on the bypass path. The fuel gas supplying path supplies fuel gas to the fuel cell. The oxide gas supplying path supplies oxide gas to the fuel cell. In the fuel cell, an electrochemical reaction is caused by using the fuel gas and the oxide gas supplied thereto. As a result, power is generated in the fuel cell. The regulator controls the gas pressure within a path arranged at its lower stream side. The upper stream side of the bypass path is communicated with the upper stream side path of the regulator, and the lower stream side of the bypass path is communicated with the lower stream side path of the regulator. The pressure controlling valve is closed in a case where the pressure difference between the upper stream side path and the lower stream side path is less than a predetermined amount, and the pressure controlling valve is opened in a case where the pressure difference between the upper stream side path and the lower stream side path exceeds the predetermined amount.

In the aforementioned system, in a case where an excessively high gas pressure is applied to the upper stream side of the regulator arranged on a gas supplying path, the pressure controlling valve arranged on the bypass path that communicates the upper stream side of the regulator with the lower stream side of the regulator opens. As a result, the gas existing in the upper stream side of the regulator flows through the bypass path into the lower stream side of the regulator. The gas pressure of the upper stream side of the regulator is lessened, thus preventing the regulator from functioning erroneously.

Furthermore, the pressure controlling valve of the fuel cell system may comprise a valve including a sealing portion, a valve seat including a sealing portion and a gas through hole, and a resilient member that biases the valve towards the valve seat. It is preferable that the gas through hole is sealed in a case where the sealing portion of the valve makes contact with the sealing portion of the valve seat, and the gas through hole is opened in a case where the sealing portion of the valve is separated from the sealing portion of the valve seat.

In a case where the fuel cell system is normally functioning, the pressure difference between the upper stream side and the lower stream side of the bypass path is maintained at a level smaller than the predetermined amount. During such condition, the sealing portion of the valve makes contact with the sealing portion of the valve seat, hence sealing the gas through hole of the valve seat. However, in a case where the pressure difference between the gas pressure of the upper stream side and the lower stream side of the bypass path exceeds the predetermined amount when the system has just been started, or the system has failed, the sealing portion of the valve is separated from the sealing portion of the valve seat by the gas pressure exerted from the upper stream side, and the gas through hole is opened. If the gas pressure of the upper stream side returns to a level less than a predetermined amount, the valve is pressed towards the valve seat by the biasing force of the resilient member. As its result, the gas through hole is again sealed.

In the aforementioned configuration, the pressure controlling valve is mechanically opened and closed by the difference in the pressure of the upper stream side and the lower stream side of the bypass path. The pressure controlling valve is not driven to open and close by a controller. Hence, the pressure controlling valve can be instantly opened in a case where the pressure of the upper stream side of the regulator has excessively increased. Furthermore, the timing at which the pressure controlling valve opens can be determined by the modulus of resilience of the resilient member. Thus, the maximum limit of the pressure to be exerted on the regulator can be determined by adjusting the modulus of resilience of the resilient member. With the aforementioned configuration, undesirable condition of an excessive pressure load being applied to the regulator can be prevented. The durability of the regulator can be guaranteed.

Furthermore, it is preferable that the valve seat includes a valve guiding portion that slidably guides the valve at a upper stream side of the sealing portion of the valve seat.

In the fuel cell system, especially in the upper stream side of the regulator on the fuel gas supplying path, only the fuel gas exists therein. Within the other side, the lower stream side of the regulator on the fuel gas supplying path, there exists not only the fuel gas but also gases that were generated in the fuel cell. Hence, by arranging the valve guiding portion at the upper stream side of the sealing portion of the valve seat, the valve guiding portion is disposed within a path where only the fuel gas flows. With such configuration, the switching motion of the valve between the opened state and the closed state is guaranteed, thus preventing the pressure controlling valve from functioning erroneously.

For example, in a fuel cell system using PEFC, the fuel cell operates under a moist condition so that the hydrogen ion and water may penetrate through the electrolyte membrane. Hence, while the upper stream side of the regulator on the fuel gas supplying path is filled with hydrogen gas, and thus dry, the lower stream side of the regulator on the fuel gas supplying path is filled with saturated water vapor, and thus moist. For the same reason, the upper stream side of the pressure controlling valve is dry, while the lower stream side of the pressure controlling valve is moist. In such fuel cell system, condensation of the water vapor existing in the lower stream side may occur after the system is deactivated. If such condensation of the vapor occurs, the water generated from the condensation may trespass into the pressure controlling valve from the lower stream side. In a case where the valve guiding portion is arranged at a stream side lower than the aforementioned sealing portion of the valve seat, the water that had entered the pressure controlling valve may be frozen at a position where the valve guiding portion is arranged, thus locking the valve of the pressure controlling valve. Furthermore, foreign substances may trespass into the pressure controlling valve from the lower stream side, giving rise to a failure in the functioning of the valve.

When the aforementioned configuration of the present invention is applied to a fuel cell system using PEFC, the valve guiding portion of the valve seat is arranged at an upper stream side of the sealing portion of the valve seat. With such configuration, the valve guiding portion of the valve seat is exposed to the hydrogen gas (which is a dry gas), hence is maintained dry and clean. The functioning of the pressure controlling valve is prevented from being hindered by the freezing of the condensed water nor the trespassing of foreign substance.

Furthermore, it is preferable that the pressure controlling valve includes a flow controlling member arranged at a gas entrance of the pressure controlling valve, and the flow controlling member regulates the speed of which gases flow into the pressure controlling valve.

With the aforementioned configuration, in a case where the pressure within the upper stream side of the pressure controlling valve excessively increases, the flow controlling member controls the amount of gas that flows into the pressure controlling valve. Thus, the pressure applied to the pressure controlling valve is prevented from being unacceptably large. Hence, in a case where the pressure within the upper stream side of the pressure controlling valve excessively increases, the functioning of the pressure controlling valve is secured.

Furthermore, it is preferable that the flow controlling member includes at least one of a flow restricting material and a filtering material.

For example, with the configuration of the flow controlling member having both the flow restricting material and the filtering material, the flow restricting material may be disposed at the gas entrance of the pressure controlling valve, and the filtering material may be disposed at the lower stream side of the flow restricting material. The valve seat may be arranged at the lower stream side of the filtering material. In this case, the gas flowing into the pressure controlling valve from the gas entrance is decelerated by flowing through a jet hole of the flow restricting material. Then, the gas is further decelerated by the filtering material. Excessive pressure is precluded from being applied to the pressure controlling valve. The functioning of the pressure controlling valve is guaranteed. It goes without saying that by using only the flow restricting material or the filtering material, the gas flowing into the pressure controlling valve from the gas entrance can be efficiently decelerated.

Furthermore, in the fuel cell system of the present invention, it is preferable that the pressure controlling valve includes a water-proofed sheet material arranged at a gas exit of the pressure controlling valve.

With the aforementioned configuration, even in a case where the gas existing in the lower stream side of the pressure controlling valve contains water vapor, the condensed water generated from the water vapor may be prevented from trespassing into the pressure controlling valve. The sheet material can be of any kinds of material so long as it is waterproofed; for instance, it can be a filter with minute vents.

BRIEF DESCRIPTION OF DRAWINGS

FIG. 1 shows a schematic construction of a fuel cell system.

FIG. 2 shows a schematic construction of a pressure controlling valve.

BEST MODE FOR CARRYING OUT THE INVENTION

The features preferably bestowed to the below embodiments are listed below.

(Feature 1) The fuel gas is a hydrogen gas, and the oxide gas is air.

(Feature 2) The fuel gas tank can store highly compressed hydrogen.

(Feature 3) A pilot valve is arranged at the gas exit of the fuel gas tank. A primary regulator is arranged adjacent to the pilot valve. A secondary regulator is arranged on the hydrogen gas supplying path that extends from the primary regulator to the fuel cell.

(Feature 4) A controller controls the switching of the pilot valve between the opened state and the closed state. The controller is connected to an ignition switch of an automobile.

(Feature 5) The controller detects the amount of load on the fuel cell, the gas consumption rate, and the pressure of the hydrogen gas supplied to the fuel cell. The controller controls the secondary regulator in accordance with the aforementioned detected results.

(Feature 6) A PEFC is used in the fuel cell system. The fuel cell system is installed in an automobile that is driven by using electricity generated by the fuel cell.

Embodiment

Figures 1, 2:
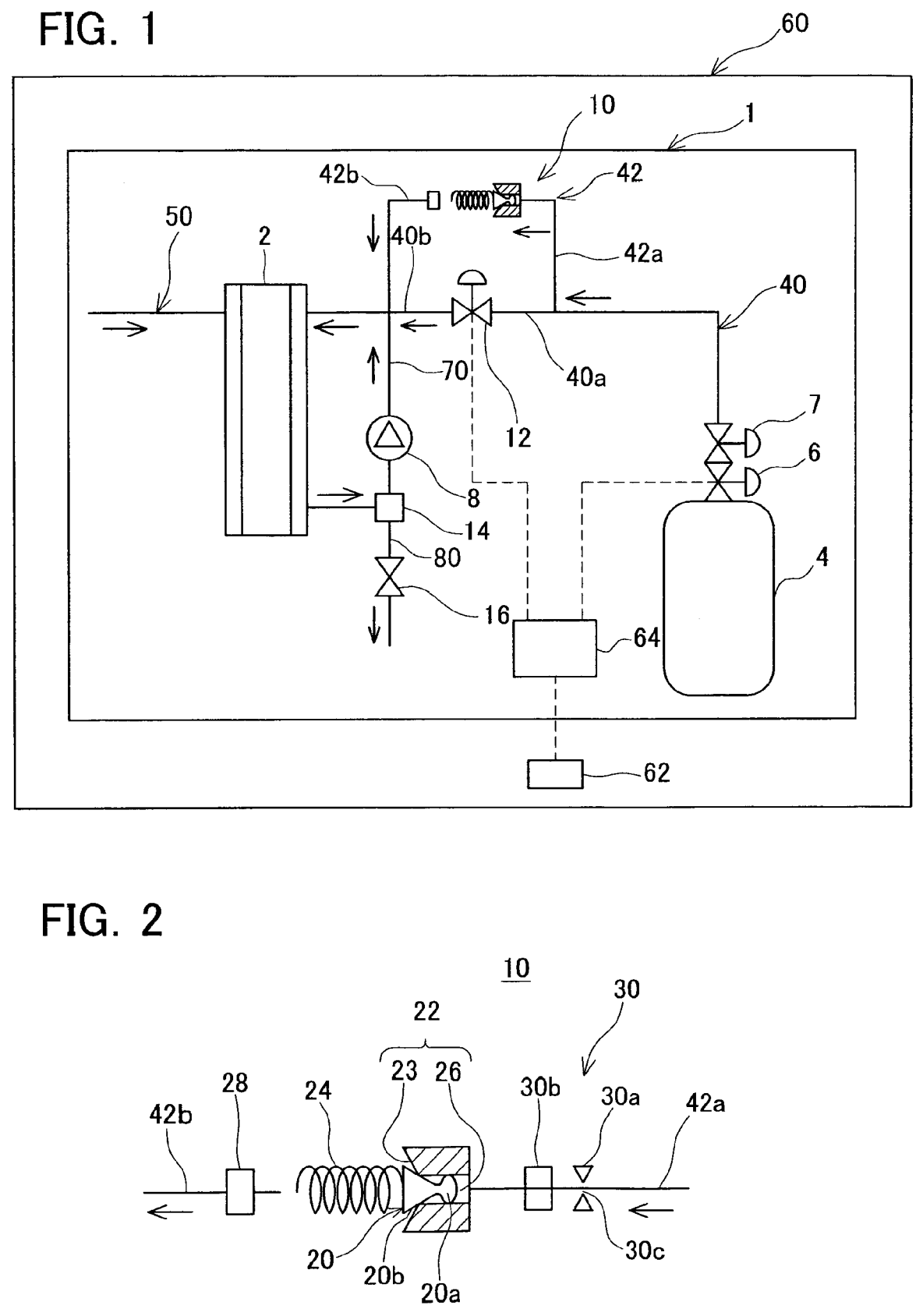

The embodiments will be described below with reference to the figures. FIG. 1 shows a schematic construction of a fuel cell system 1. The fuel cell system 1 is installed in an automobile 60. The fuel cell system 1 includes a fuel cell 2, an oxide gas supplying path 50, a storing tank 4, a pilot valve 6, a primary regulator 7, a hydrogen gas supplying path 40, a secondary regulator 12, a bypass path 42, a pressure controlling valve 10, a vapor-liquid separator 14, a hydrogen circulation path 70, a pump 8, a drainage path 80, a drainage valve 16, and a controller 64.

The storing tank 4 is capable of storing hydrogen in a super-compressed condition. The pilot valve 6 is arranged at the gas exit of the storing tank 4. The hydrogen in the storing tank 4 flows out to the hydrogen gas supplying path 40 when the pilot valve 6 is opened. The flowing of the hydrogen gas from the storing tank 4 to the hydrogen gas supplying path 40 is cut off when the pilot valve 6 is closed. The switching of the pilot valve 6 between the opened state and the closed state is controlled by the controller 64. No gas piping exists between the gas exit of the storing tank 4 and the pilot valve 6.

The primary regulator 7 is arranged at the lower stream side of the pilot valve 6. The primary regulator 7 is capable of decreasing the gas pressure of the hydrogen gas supplied from the storing tank 4 to a predetermined pressure level. The pilot valve 6 and the primary regulator 7 are disposed adjacent to each other. That is, no gas piping exists between the pilot valve 6 and the primary regulator 7.

The hydrogen gas supplying path 40a is arranged at the lower stream side of the primary regulator 7. The upper stream side of the secondary regulator 12 is communicated with the lower stream of the hydrogen gas supplying path 40a. The secondary regulator 12 is capable of further decreasing the gas pressure of the hydrogen gas that is already decreased by the primary regulator 7 on its way out from the storing tank 4. The controller 64 detects the amount of load that is burdened on the fuel cell, the gas consumption amount thereof, and the pressure of the hydrogen gas being supplied to the fuel cell. The secondary regulator 12 is controlled by the controller 64 in accordance with the results detected by the controller 64. The lower stream side of the secondary regulator 12 is communicated with the hydrogen gas supplying path 40b. The lower stream side of the hydrogen gas supplying path 40b is connected to the fuel cell 2. The hydrogen gas whose pressure is lessened by the secondary regulator 12 flows through the hydrogen gas supplying path 40b into the hydrogen electrode side of the fuel cell 2.

Further, the upper stream side path 40a and the lower stream side path 40b are connected by the bypass path 42. The pressure controlling valve 10 is arranged on the bypass path 42. The pressure controlling valve 10 is designed to close while the pressure difference between the pressure of the upper stream side and the pressure of the lower stream side of the bypass path 42 is under a predetermined difference level, and to open when the pressure difference exceeds the predetermined difference level.

The hydrogen circulation path 70 is connected to the hydrogen supplying path 40b. The extra hydrogen that were not used by the fuel cell 2 is exhausted along with water and vapor. The mixture thereof is separated into drain water and hydrogen rich gas by the liquid-vapor separator 14. The hydrogen rich gas is introduced into the hydrogen circulation path 70, and the pump 8 sends the hydrogen rich gas into the hydrogen supplying path 40b. Here, the hydrogen rich gas is again supplied to the fuel cell 2. The water separated by the liquid-vapor separator 14 is drained from the drainage valve 16.

The fuel cell 2 is a stack of a plurality of fuel cells. Each cell comprises an anode including a catalyst layer and a gas diffusing layer, a cathode including a catalyst layer and a gas diffusing layer, and an electrolyte membrane (for example, fluorine-resinous ion-exchanging membrane) arranged in between the anode and the cathode. The hydrogen gas is supplied from the hydrogen gas supplying path 40b to the hydrogen electrode side of the fuel cell 2, and oxide gas (in the present embodiment, compressed air) is supplied from the oxide gas supplying path 50 to the air electrode side of the fuel cell 2. Protons and electrons obtained from the hydrogen gas supplied to the hydrogen electrode side chemically react with the oxygen of the oxide gas supplied to the air electrode side, generating water as the result of the chemical reaction. The electricity generated from the current generated by the aforementioned chemical reaction is used as the driving source of the automobile 60 of which the fuel cell system 1 is installed. Because the fuel cell 2 using PEFC is driven in a moist condition, the primary side path 40a of the hydrogen supplying path 40 is filled with hydrogen gas, and thus kept dry, while the secondary side path 40b of the hydrogen supplying path 40 is filled with saturated water vapor, and thus wet or moist.

FIG. 2 shows a schematic construction of a pressure controlling valve 10. The pressure controlling valve 10 includes a valve 20, a valve seat 22 having a gas through hole 26, a resilient member 24 that biases the valve 20 towards the valve seat 22. In the present embodiment, a spring is used as the resilient member 24.

The valve 20 is movable in the axial direction of the pressure controlling valve 10. The valve 20 is capable of switching between the state of making contact to the valve seat 22 and the state of being separated from the valve seat 22. At the upper stream side end of the valve 20, a sliding portion 20a is defined. A sealing portion 20b is defined at the lower stream side of the sliding portion 20a. The sliding portion 20a is arranged to be located inside the gas through hole 26 of the valve seat 22. The sliding portion 20a is guided along the internal surface of the gas through hole 26. Hence, in a case where the valve 20 moves in the axial direction of the pressure controlling valve 10, the sliding portion 20a slides along the internal surface of the gas through hole 26. The valve 20 is capable of moving in the axial direction of the pressure controlling valve 10 in a stable manner. (In the present embodiment, the inner surface of the gas through hole 26 of the valve seat 22 functions as the valve guiding portion.)

The valve seat 22 includes a sealing portion 23. The sealing portion 23 is consecutively arranged at the lower stream side of the gas though hole 26. In a state which the valve 20 makes contact with the valve seat 22, the sealing portion 20b of the valve 20 makes contact with the sealing portion 23 of the valve seat 22, thus closing the gas through hole 26 of the valve seat 22. A state in which the valve 20 is separated from the valve seat 22, the sealing portion 20b of the valve 20 is separated from the sealing portion 23 of the valve seat 22, thus opening the gas through hole 26 of the valve seat 22. When the gas through hole 26 is opened, the gas entrance and the gas exit of the pressure controlling valve 10 are communicated. One end of the bypass path 42a is communicated with the gas entrance of the pressure controlling valve 10, while the other end of the bypass path 42a is communicated with the upper stream side path 40a of the hydrogen supplying path 40. Furthermore, one end of the bypass path 42b is connected to the gas exit of the pressure controlling valve 10, while the other end of the bypass path 42b is connected with the lower stream side path 40b of the hydrogen supplying path 40.

The resilient member 24 is arranged at the lower stream side of the sealing portion 20b of the valve 20. The resilient member 24 is in a springedly-compressed state when the valve 20 is making contact with the valve seat 22. With the force from the aforementioned compression, the valve 20 is biased toward the valve seat 22. On the upper stream side of the valve 20, pressure of the hydrogen gas existing in the upper stream-sided bypass path 42a is applied, while, on the other hand, pressure of the hydrogen gas existing in the lower stream-sided bypass path 42b is applied to the lower stream side of the valve 20. Thus, in a case where the pressure of the hydrogen gas within the upper stream side of the valve 20 becomes higher than the pressure of the hydrogen gas within the lower stream side of the valve 20, and the pressure difference between the said upper stream side and the said lower stream side exceeds the predetermined amount, the valve 20 is detached from the valve seat 22, resisting against the biasing force applied by the resilient member 24.

The pressure difference between the upper stream side and the lower stream side of the valve 20 at which the valve 20 detaches from the valve seat 22 can be adjusted by the amount of spring compression applied to the resilient member 24 when the valve 20 and the valve seat 22 are making contact; that is, when the pressure controlling valve 10 is in its closed state. The pressure difference can be determined in accordance with a pressure level at which the secondary regulator 12 is able to function. The pressure at which the pressure controlling valve 10 opens can be determined at any rate within a range of pressure that is smaller than the pressure at which the secondary regulator 12 is able to function. With such configuration, when the pressure difference between the bypass path 42a on the primary side and the bypass path 42b on the secondary side becomes greater than or equal to the determined pressure level at which the pressure controlling valve 10 opens, the valve 20 is detached from the valve seat 22. Undesirable condition of which an excessive pressure is applied to the secondary regulator 12 is configured to be prevented.

At the gas entrance of the aforementioned pressure controlling valve 10, a flow controlling member 30 is arranged. The flow controlling member 30 includes a flow restricting member 30a and a filtering member 30b. The flow restricting member 30a comprises a jet hole 30c. The jet hole 30c restricts the amount of hydrogen gas flowing into the pressure controlling valve 10 from the bypass path 42a, and decelerate the speed at which it flows in. The filtering member 30b removes foreign substances included in the hydrogen gas which has passed through the flow restricting member 30a. Moreover, the filtering member 30b also functions as a flow resistor thereof. Hence, the hydrogen gas that has passed through the flow restricting member 30a is further decelerated by the filtering member 30b. Undesirable condition of which an excessive pressure being applied to the valve of the pressure controlling valve 10 can be prevented. In the present embodiment, the flow restricting member 30a and the filtering member 30b are adjacently arranged. However, the flow restricting member and the filtering member may each be used individually. In such case, excessive pressure exertion can also be mitigated. Since the gas pressure from the bypass path 42a is precluded from having direct effect on the valve 20, the valve 20 is prevented from being erroneously opened.

At the gas exit of the pressure controlling valve 10, on the other hand, a sheet material 28 is arranged. The sheet material 28 is a poromeric and water-proofed material. With the waterproofed sheet material 28 arranged thereof, the condensed water and foreign substances from the lower stream-sided (secondary-sided) bypass path 42b under the moist condition can be prevented from trespassing into the pressure controlling valve 10. Furthermore, since the sheet material 28 is poromeric, the hydrogen gas from the upper stream side of the secondary regulator 12 can flow through the bypass path 42 into the lower stream side of the secondary regulator 12.

The valve 20, valve seat 22, resilient member 24, sheet material 28 and flow controlling member 30 are contained in a body not shown in the figures.

The operation process of the fuel cell system 1 of the present embodiment will be briefly described below. When the ignition switch 62 of the automobile 60 is turned on, the fuel cell system 1 is activated. The controller 64 controls the pilot valve 6 to open, and the hydrogen gas stored in the storing tank 4 is released into the hydrogen gas supplying path 40a. The hydrogen gas released through the pilot valve 6 is decompressed by the primary regulator 7. The hydrogen gas released through the primary regulator 7 flows into the secondary regulator 12. The secondary regulator 12 regulates the pressure of the hydrogen gas that flows in from the hydrogen gas supplying path 40a to be at an adequate pressure level to be supplied to the fuel cell 2. That is, the controller 64 determines the pressure level of the hydrogen gas to be supplied to the fuel cell 2 in accordance with the load status of the fuel cell 2, amount of hydrogen gas circulated from the hydrogen circulation path 70 and various other factors. The secondary regulator 12 is driven by the controller 64 so that the hydrogen gas is adjusted to be of the determined pressure level. As the result, the secondary regulator 12 decompresses the hydrogen gas to be at the adequate pressure level to supply it to the fuel cell 2. With this configuration, hydrogen gas and oxide gas of adequate pressure levels are provided to the fuel cell 2. Undesirable conditions such as the degrading of the electrolytic membrane or the decrease in durability of the fuel cell 2 are effectively prevented.

In a case where the ignition switch 62 of the automobile 60 is turned off, the fuel cell system 1 is also deactivated. The pilot valve 6 and the secondary regulator 12 are closed by the controller 64. Thus, the supply of hydrogen gas to the fuel cell 2 stops.

For example, in a case were the storing tank 4 is sealed air tight, and the secondary regulator 12 is slightly leaking at the time of the fuel cell system 1 is deactivated, the pressure inside the pipes of the upper stream side of the secondary regulator 12 decreases to the atmospheric pressure level. If the ignition switch 62 is turned on during such state and the system 1 is activated, the super compressed hydrogen from the storing tank 4 gushes out into the hydrogen gas supplying path 40, and the pressure of the upper stream side of the secondary regulator 12 sharply increases. In a case where a temporary pressure peak occurs with the hydrogen gas existing in the upper stream of the secondary regulator 12, the pressure difference between the upper stream side and the lower stream side of the secondary regulator 12 exceeds the predetermined difference level. As the result, the pressure controlling valve 10 is opened. The pressure of the hydrogen gas existing in the upper stream side of the secondary regulator 12 is decreased, and the secondary regulator 12 is protected from erroneously functioning or being damaged. Furthermore, in a case where the hydrogen gas is leaking into the hydrogen gas supplying path 40 from the storing tank 4 due to undesirable conditions such as the failure of the pilot valve 6 or the primary regulator 7, the pressure of the hydrogen gas in the upper stream side of the secondary regulator 12 may excessively rise. In such case, the pressure controlling valve 10 is opened, and the pressure of the hydrogen gas exerted on the secondary regulator 12 can be decompressed. The erroneous functioning of or damages to the secondary regulator 12 is effectively prevented.

The pressure controlling valve 10 of the present embodiment guides the sliding portion 20a of the valve 20 using the inner surface of the gas through hole 26 of the valve seat 22. The sliding portion 20a is positioned at a side where hydrogen gas (dry gas) flows. With this configuration, the stably operation of the valve 20 is guaranteed.

Furthermore, the water-proofed sheet material 28 is arranged at the gas exit (the lower stream side exit) of the pressure controlling valve 10. The trespassing of water from the lower stream-sided hydrogen gas supplying path 40b into the pressure controlling valve 10 is prevented. Undesirable conditions such as the condensed water freezing within the pressure controlling valve 10 can be prevented. With this configuration, the operation of the valve 20 is guaranteed in a stable manner.

Specific examples of the present invention were described in detail above, however these are simply illustrations, and do not limit the scope of the claims. Various modifications and changes to the specific examples illustrated above are within the technology disclosed in the claims.

Further, the technological components described in the present specification or the drawings exhibit technological utility individually or in various combinations, and are not limited to the combinations disclosed in the claims at the time of application. Furthermore, the technology illustrated in the present specification or the drawings may simultaneously achieve a plurality of objects, and has technological utility by achieving one of these objects.

The invention claimed is:

1. A fuel cell system, comprising:
 a fuel cell;
 a fuel gas supplying path connected to the fuel cell, the fuel gas supplying path supplying a fuel gas to the fuel cell;
 an oxide gas supplying path connected to the fuel cell, the oxide gas supplying path supplying an oxide gas to the fuel cell;
 a regulator arranged on at least one of the fuel gas supplying path and the oxide gas supplying path;
 a bypass path that communicates an upper stream side path of the regulator with a lower stream side path of the regulator; and
 a pressure controlling valve arranged on the bypass path, wherein the pressure controlling valve closes in a case where the pressure difference between the upper stream side path and the lower stream side path is less than a predetermined amount, and the pressure controlling valve opens in a case where the pressure difference between the upper stream side path and the lower stream side path exceeds the predetermined amount,
 wherein the pressure controlling valve is configured to be mechanically opened and closed by the pressure difference between the upper stream side path and the lower stream side path.

2. The fuel cell system as in claim 1, wherein the pressure controlling valve comprises:
 a valve including a sealing portion;
 a valve seat including a sealing portion and a gas through hole; and
 a resilient member that biases the valve towards the valve seat;
 wherein the gas through hole is sealed in a case where the sealing portion of the valve makes contact with the sealing portion of the valve seat, and the gas through hole is opened in a case where the sealing portion of the valve is separated from the sealing portion of the valve seat.

3. The fuel cell system as in claim 2,
 wherein the valve seat includes a valve guiding portion that slidably guides the valve at a upper stream side of the sealing portion of the valve seat.

4. The fuel cell system as in claim 1,
 wherein the pressure controlling valve includes a flow controlling member arranged at a gas entrance of the pressure controlling valve, and the flow controlling member controls the amount of gas flowing into the pressure controlling valve.

5. The fuel cell system as in claim 4,
 wherein the flow controlling member includes at least one of a flow restricting material and a filtering material.

6. The fuel cell system as in claim 1,
 wherein the pressure controlling valve includes a water-proofed sheet material arranged at a gas exit of the pressure controlling valve.

7. The fuel cell system as in claim 1, wherein the regulator is arranged on the fuel gas supplying path.

8. The fuel cell system as in claim 1, wherein the pressure controlling valve comprises:
  a valve including a sealing portion;
  a valve seat including a sealing portion and a gas through hole; and
  a resilient member that biases the valve towards the valve seat;
  wherein the gas through hole is sealed in a case where the sealing portion of the valve makes contact with the sealing portion of the valve seat, and the gas through hole is opened in a case where the sealing portion of the valve is separated from the sealing portion of the valve seat.

9. The fuel cell system as in claim 8, wherein the valve seat includes a valve guiding portion that slidably guides the valve at a upper stream side of the sealing portion of the valve seat.

10. The fuel cell system as in claim 9, wherein the fuel gas is a hydrogen gas, and the oxide gas is air.

11. The fuel cell system as in claim 10, wherein the pressure controlling valve includes a water-proofed sheet material arranged at a gas exit of the pressure controlling valve.

12. A fuel cell system, comprising:
  a fuel cell;
  a fuel gas tank configured to store compressed fuel gas;
  a fuel gas supplying path connected to the fuel cell and the fuel gas tank, the fuel gas supplying path supplying a fuel gas from the fuel gas tank to the fuel cell;
  an oxide gas supplying path connected to the fuel cell, the oxide gas supplying path supplying an oxide gas to the fuel cell;
  a regulator arranged on the fuel gas supplying path;
  a bypass path that communicates an upper stream side path of the regulator with a lower stream side path of the regulator; and
  a pressure controlling valve arranged on the bypass path, wherein the pressure controlling valve closes in a case where the pressure difference between the upper stream side path and the lower stream side path is less than a predetermined amount, and the pressure controlling valve opens in a case where the pressure difference between the upper stream side path and the lower stream side path exceeds the predetermined amount, the pressure controlling valve comprising a valve including a sealing portion, a valve seat including a sealing portion and a gas through hole; and a resilient member that biases the valve towards the valve seat;
  wherein the gas through hole is sealed in a case where the sealing portion of the valve makes contact with the sealing portion of the valve seat, and the gas through hole is opened in a case where the sealing portion of the valve is separated from the sealing portion of the valve seat.

13. The fuel cell system as in claim 12, further comprising a pilot valve arranged between the fuel gas tank and the fuel gas supplying path, wherein the fuel gas in the fuel gas tank flows to the fuel gas supplying path when the pilot valve is opened, and the fuel gas from the fuel gas tank to the fuel gas supplying path is cut off when the pilot valve is closed.

14. The fuel cell system as in claim 13, further comprising a primary regulator arranged between the pilot valve and the fuel gas supplying path, wherein the primary regulator is configured to decrease the gas pressure of the fuel gas from the pilot valve so that the fuel gas whose pressure is decreased flows to the fuel gas supplying path.

15. The fuel cell system as in claim 14, further comprising a hydrogen circulation path communicating the fuel cell with the lower stream side of the fuel gas supplying path of the regulator.

16. The fuel cell system as in claim 15, wherein the pressure controlling valve includes a water-proofed sheet material arranged at a gas exit of the pressure controlling valve.

17. The fuel cell system as in claim 12, wherein the valve seat includes a valve guiding portion that slidably guides the valve at a upper stream side of the sealing portion of the valve seat.

18. The fuel cell system as in claim 17, wherein the pressure controlling valve includes a flow controlling member arranged at a gas entrance of the pressure controlling valve, and the flow controlling member controls the amount of gas flowing into the pressure controlling valve.

19. A fuel cell system, comprising:
  a fuel cell;
  a fuel gas supplying path connected to the fuel cell, the fuel gas supplying path supplying a fuel gas to the fuel cell;
  an oxide gas supplying path connected to the fuel cell, the oxide gas supplying path supplying an oxide gas to the fuel cell;
  a regulator arranged on at least one of the fuel gas supplying path and the oxide gas supplying path;
  a bypass path that communicates an upper stream side path of the regulator with a lower stream side path of the regulator; and
  a pressure controlling valve arranged on the bypass path, wherein the pressure controlling valve closes in a case where the pressure difference between the upper stream side path and the lower stream side path is less than a predetermined amount, and the pressure controlling valve opens in a case where the pressure difference between the upper stream side path and the lower stream side path exceeds the predetermined amount,
  wherein the pressure controlling valve includes a water-proofed sheet material arranged at a gas exit of the pressure controlling valve.

* * * * *

UNITED STATES PATENT AND TRADEMARK OFFICE
CERTIFICATE OF CORRECTION

PATENT NO.         : 8,088,531 B2
APPLICATION NO.    : 12/279638
DATED              : January 3, 2012
INVENTOR(S)        : Koji Katano et al.

It is certified that error appears in the above-identified patent and that said Letters Patent is hereby corrected as shown below:

| Column | Line | |
|--------|------|---|
| 1 | 7-10 | Delete the entire paragraph. |
| 10 | 51 | Change "a upper" to --an upper--. |
| 11 | 16 | Change "a upper" to --an upper--. |
| 12 | 21 | Change "a upper" to --an upper--. |

Signed and Sealed this
Eighth Day of January, 2013

David J. Kappos
*Director of the United States Patent and Trademark Office*